United States Patent [19]

Reid

[11] 3,846,994

[45] Nov. 12, 1974

[54] LOW TEMPERATURE NATURAL GAS TRANSMISSION

[76] Inventor: William M. Reid, 1766 Maux, Houston, Tex. 77043

[22] Filed: Nov. 5, 1973

[21] Appl. No.: 412,783

[52] U.S. Cl. .................................. 62/87, 48/191
[51] Int. Cl. ............................................. F25b 9/02
[58] Field of Search ................... 62/86–88, 401, 62/402, 26, 30; 48/191

[56] References Cited
UNITED STATES PATENTS

| | | | |
|---|---|---|---|
| 2,740,701 | 4/1956 | Tenney, Jr. ................ | 48/191 X |
| 2,875,589 | 3/1959 | Horn ............................ | 62/87 |
| 3,002,362 | 10/1961 | Morrison ..................... | 62/402 |
| 3,118,751 | 1/1964 | Seidel .......................... | 62/88 X |

Primary Examiner—Meyer Perlin
Assistant Examiner—Ronald C. Capossela
Attorney, Agent, or Firm—Pravel & Wilson

[57] ABSTRACT

Natural gas is transmitted by pipeline at low temperature by maintaining pump stations which warm the pipeline gas, compress the warm gas, cool the compressed gas by rejecting heat to the atmosphere and expanding the cooled gas to pipeline pressure and the temperature below that which could cause damage to the surroundings of the pipeline. The described method is used to protect arctic permafrost from melting by virtue of temperature of a natural gas pipeline running through such permafrost.

6 Claims, 2 Drawing Figures

PATENTED NOV 12 1974　　　　　　　　　　　3,846,994

_3,846,994_

LOW TEMPERATURE NATURAL GAS TRANSMISSION

BACKGROUND OF THE INVENTION

This invention relates to the transmission of natural gas particularly from the arctic regions to more temperate climates. In transmitting such natural gas, billions of cubic feet of natural gas per day must cross the permafrost which extends thousands of feet below the surface of the earth. If normal natural gas transmission procedures are used whereby a series of compressor stations compress the gas to boost the pipeline pressure in order to move the gas, the permafrost could become melted by higher temperatures of natural gas. The melting of the permafrost could cause the pipeline to sink and bury itself ever deeper into the permafrost causing not only damage to the piepline, but also damage to the environment itself. Accordingly, it is necessary to employ a system whereby the natural gas is pumped, and the temperature of the material in the pipeline maintained, at a temperature below that at which the permafrost would melt.

Previously, it has been proposed to accomplish this result by refrigerating said gas by outside refrigeration means to reduce the temperature prior to returning it to the pipeline for transmission after compressing the natural gas to approximately pipeline pressures. This method has inherent disadvantages in view of the necessity of maintaining refrigeration equipment of sufficient size to cool such large volumes of natural gas continuously. It is well known that refrigeration systems require continuing periodic maintenance in order to maintain its operating efficiency, often requiring that additional refrigerant, usually a fluorinated hydrocarbon or propane, to be charged to the system. Since during summer months when refrigeration is needed most, the permafrost becomes melted at its surface and virtually impassable for ground vehicles; such maintenance would be extremely difficult and expensive since tons of refrigerant fluid must be transported under high pressures to the various pumping stations which would, of necessity, be located in a wilderness practically inaccessible by any mode of transportation other than by air.

Accordingly, it is the object of this invention to provide a system whereby the large volumes of natural gas can be efficiently transmitted by pipeline with the temperature of such gas in the pipeline to be maintained at a point power than that at which the permafrost may melt. It is a further object of this invention to utilize the natural gas in the pipeline itself to the largest extent in order to move the natural gas and at the same time maintain its low temperature.

SUMMARY OF THE INVENTION

This invention relates to a method whereby natural gas may be transmitted in a pipeline at low temperature in order to prevent damage to the arctic environment. In the practice of this method, natural gas, either from a gas well or a transmission pipeline, is first warmed usually in a gas-to-gas heat exchanger. When ambient air temperature is lower than about −5°F., the entering gas will be cooled in the heat exchanger. The gas is then compressed in a compressor to a pressure greater than that at which it should be introduced into a pipeline and then cooled by discharging heat in the natural gas to the atmosphere, usually through an aerial cooler. The partially cooled gas is then conducted to the gas-to-gas heat exchanger used for warming or cooling gas, as the case may be, before entering the compressor. Pipeline temperature, substantially below that at which the arctic environment may be damaged, and pipeline pressure is achieved by running the gas through an expander, when necessary, after which the gas is reintroduced into the pipeline for further transmission.

DESCRIPTION OF THE PREFERRED EMBODIMENT

With the discovery of enormous oil and gas reserves in the arctic region, monumental transportation problems were created of how to move these valuable materials to warmer climates without endangering the delicate ecology of the arctic regions. In the practice of this invention, pipelines traversing the distance transporting billions of cubic feet of natural gas per day would be used. Since thousands of miles of terrain covered with permafrost must be traversed, it is necessary to maintain a temperature lower than about 30°F. throughout the length of the pipeline in order that such permafrost not be melted by the pipeline. In transporting the natural gas, a number of intermediate pumping stations are necessary where the natural gas in the pipeline is repressured to keep it moving toward its destination. While any temperature of the natural gas which would prevent the melting of the permafrost is satisfactory, it is preferred that it be maintained between zero and 20°F. While it is preferable to return the gas to the pipeline at from about 10°F. to about 20°F., temperatures as low as −20°F. can be tolerated without resorting to special, more expensive metals in the construction of the pipeline. Generally, when the pressure of the gas drops to about 1,300 to 1,450 psig, it must be repressurized and returned to the pipeline at about 1,600 to 1,800 psig. Of course, those skilled in the art would readily know how to vary these pressures advantageously and the foregoing pressures are given purely by way of example in the practice of this invention.

Figure 1:
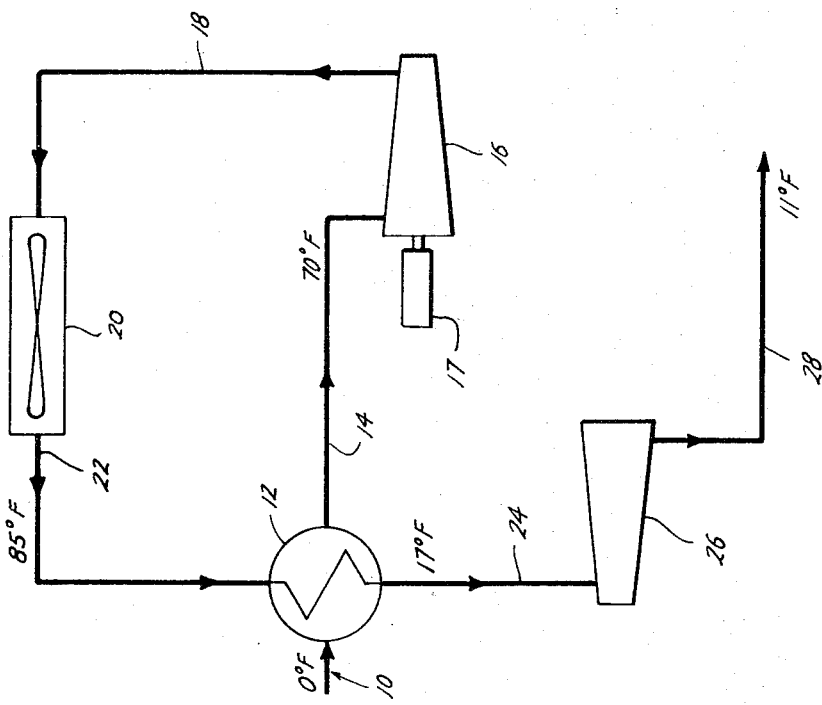
FIG. 1 of the drawings is a schematic representation of the method of the invention wherein such usual components as valve controls, liquid traps, and the like, well-known to the ordinary engineer, are omitted. While centrifugal equipment is shown, other types of equivalent equipment may be used.

For a particular illustration of the practice of this invention wherein ambient air temperature is 80°F., the method shown schematically in FIG. 1 will be used. The natural gas in the pipeline will enter the system from a gas transmission line or a well head at, for example, 0°F. and about 1,376 psig through line 10 and enter a gas-to-gas heat exchanger where the temperature is raised in this illustration, as hereinafter described, to about 70°F., exiting said heat exchanger 12 through line 14. The gas then is compressed in a compressor 16 driven by a drive means 17 to a pressure sufficiently high to return the gas in accordance with this example to the transmission line at about 1,690 psig, allowing for a pressure drop through the rest of the system used in the practice of the method of my invention.

The gas exits the compressor 16 through line 18 at this elevated pressure and temperature and is conveyed to a cooler 20 where the temperature of the natural gas is reduced to about 85°F. In the practice of the invention the cooler is any such cooler which will exhaust the heat removed from the gas to the surroundings such as, preferably, aerial coolers where air is forced around finned tubes by a fan to remove the heat. The gas at about 85°F. exits the cooler through line 22 to heat exchanger 12 wherein the temperature is reduced to about 17°F. in the heating of the natural gas being introduced from the pipeline. The cooled gas exits heat exchanger 12 through line 24 to a gas expander 26 where it is expanded to a pressure of about 1,690 psig and a temperature less than the temperature at which the environment would be harmed, in this example about 11°F. The gas thus expanded is then returned through line 28 to the pipeline where it continues its journey toward its ultimate destination.

The drive means 17 may be any suitable power source but it is preferable to use a gas turbine which would operate using a stream of natural gas taken from the pipeline gas as its energy source. It would further be equipped so that it could be quickly disconnected and removed by a helicopter, for example, and another turbine lowered into its place should maintenance be necessary. A suitable turbine is, for example, made by the Solar Division of International Harvester and designated as a Centaur model.

Figure 2:
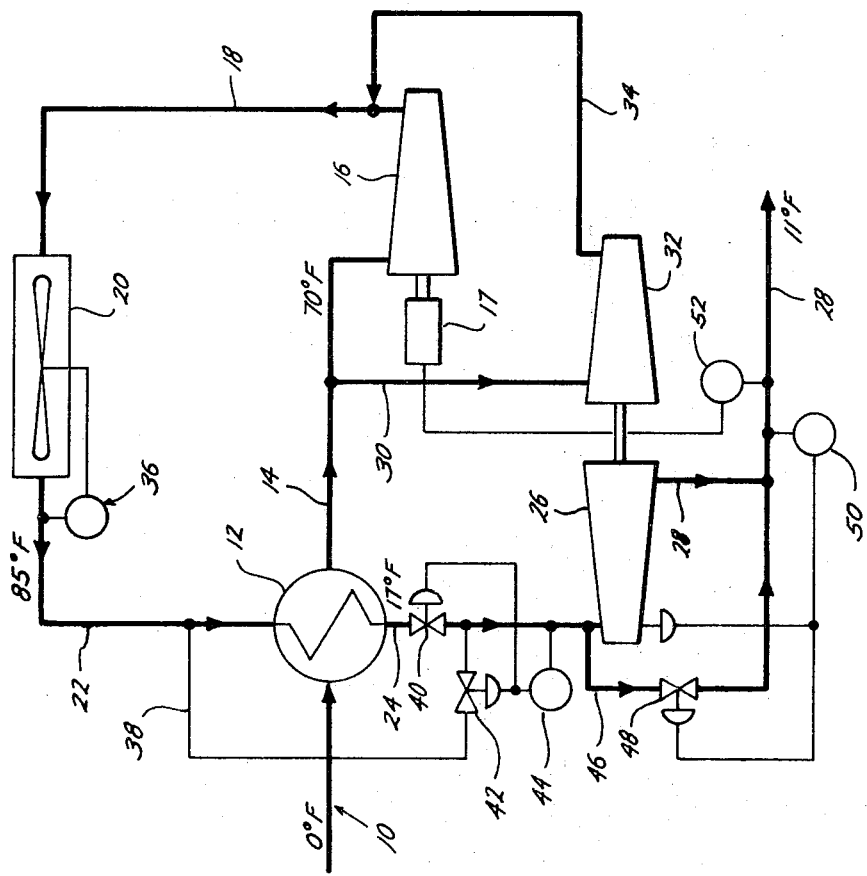
FIG. 2 is a more detailed schematic of the invention with the valves, liquid traps, and controls omitted, but showing some controls which may be used to optimize the practice of the method of this invention.

Using the same conditions as set forth in the previous discussion of FIG. 1, FIG. 2 schematically describes the operation of the process of the invention with the controls necessary to compensate for ambient temperature variation and optimize the energy of the system while reducing the temperature of the gas being introduced back into the pipeline at a temperature lower than the freezing point of the surrounding arctic environment. Further, it is usually necessary to stay above certain minimum temperatures, usually about −20°F., to prevent embrittlement of the metal used to construct the pipeline by introducing the gas at a temperature so low that such embrittlement may occur. It is also well to keep the temperature above the dew point of the hydrocarbon being transported.

In the discussion of FIG. 2, the components common to those described above with respect to FIG. 1 have the same numerical representation.

The gas enters, as previously described, through line 10 through the heat exchanger 12 and through line 14, a portion of the gas in line 14 is compressed in the compressor 16, described above, while the balance of the gas is removed from line 14 through line 30 to an auxiliary compressor 32 driven by the gas expander 26 in order to utilize the energy of the expanding gas. The compressed gas leaves the auxiliary compressor 32 through line 34 and joins the main stream of compressed natural gas in line 18. It is then cooled to 85°F. in the aftercooler 20. The temperature drop in the aftercooler and its operation is controlled by a temperature switch 36 responsive to the exit gas temperature above the desired minimum level. Preferably, the aftercooler is made up of a series of cooling sections which, as the ambient air temperature decreases, may be individually taken out of service automatically by the temperature switch 36.

The cooled gas leaving the aftercooler 20 in line 22 which is equipped with a bypass line 38 wherein part of the gas may bypass heat exchanger 12 in order that the gas leaving the heat exchanger 12 be maintained at the desired temperature, here approximately 17°F. This temperature is maintained by control valve 40 in line 24 and control valve 42 in line 38 connected to a temperature controller 44 which is responsive to the temperature of the gas in the line 24 downstream from where the bypass stream 38 re-enters the line 24. Line 24 then carrys the gas to the gas expander 26; but prior to said expander 26, a sidestream 46 is removed from line 24. The flow in sidestream 46 is determined by control valve 48 connected to a temperature controller 50 which is responsive to the temperature of the gas in line 28 prior to its introduction into the pipeline.

As the ambient temperatures decrease in winter, the necessity to employ the gas expander to cool the gas diminishes and when ambient air used in aerial coolers drops to about 40°F., the expander may be bypassed entirely and the gas in line 24 can be returned to the pipeline through line 28. However, with higher ambient temperatures, it is necessary to employ the gas expander 26 to efficiently return the gas to the pipeline at desired conditions.

The pressure of the natural gas in line 28 prior to its introduction into the pipeline in monitored by a pressure controller 52 which controls the drive means 17 of the gas compressor 16 to provide adequate compression of the gas to result in the desired outlet gas pressure.

Having thus described the operation of the method of the invention, the following table is presented to illustrate the operational parameters of the method of this invention responsive to changes in atmospheric temperatures to illustrate year-round operation. The conditions in the operation of the system are shown corresponding to points on the above-discussed FIG. 1 and FIG. 2 and assumes a mechanical efficiency of the system at 80 percent.

From the Table it will be noted that when ambient air is reduced from about 60°F. to about 40°F. that the expander 26 is no longer in service as shown by the presence of the same temperatures and pressures in lines 24 and 28. It should also be noted that, as the ambient temperature drops, the net horsepower required to operate the station also is reduced. Less fuel is consumed Table

| Point on FIGS. | 22 | | 10 | | 14 | | 18 | | 24 | | 28 | | Net Station Horse-Power |
|---|---|---|---|---|---|---|---|---|---|---|---|---|---|
| Air Temp. °F. | °F | PSIA | °F | PSIA | °F | PSIA | °F | PSIA | °F | PSIA | °F | PSIA | |
| 80 | 85 | 1822.2 | 0 | 1391.4 | 70 | 1381.4 | 112.3 | 1832.2 | 16.8 | 1812.2 | 11 | 1704.7 | 48,680 |
| 60 | 65 | 1752.2 | 0 | 1391.4 | 52.7 | 1381.4 | 88.2 | 1762.2 | 13.1 | 1742.2 | 11 | 1704.7 | 40,643 |
| 40 | 45 | 1714.7 | 0 | 1391.4 | 36.3 | 1381.4 | 64.6 | 1724.7 | 9.3 | 1704.7 | 9.3 | 1704.7 | 30,155 |
| 20 | 25 | 1714.7 | 0 | 1391.4 | 19.8 | 1381.4 | 46.8 | 1724.7 | 10.2 | 1704.7 | 10.2 | 1704.7 | 27,504 |
| 0 | 5 | 1714.7 | 0 | 1391.4 | 3.5 | 1381.4 | 29.1 | 1724.7 | 10.6 | 1704.7 | 10.6 | 1704.7 | 24,704 |
| −20 | −15 | 1714.7 | 0 | 1391.4 | −12.3 | 1381.4 | 10.3 | 1724.7 | −4.4 | 1704.7 | −4.4 | 1704.7 | 21,548 | in the compression of the gas to run the drive means 17 and, by choice of compressor capacity, a portion of the horsepower saving could be used to transmit additional gas during cold weather when the fuel demand at the ultimate destination of the natural gas is at its greatest. Thus, the practice of this invention not only represents a substantial savings in transmission of natural gas, but also results in greater amounts of natural gas being transmitted when energy shortages manifest themselves most dramatically, i.e., at peak use periods. In fact, when the air temperature is very low, the pipeline can transmit almost 20 percent more than the design capacity of the pipeline. Thus, it is seen that the advantages of this invention are very dramatic in that its practice not only protects the environment from the transmission of the natural gas, but also provides savings in transportation costs, maintenance and fuel.

By the foregoing discussion and examples, those of ordinary skill in the art would be able to make obvious modifications of the parameters described and the equipment used without departing from the scope and spirit of this invention as set forth in the appended claims.

I claim:

1. A method for moving natural gas at low temperatures in a pipeline which comprises;
   a. conducting the natural gas through a heat exchanger wherein heat is transferred with the cooled gas from step (c);
   b. compressing the natural gas from step (a) to a pressure greater than the pressure of the pipeline at the point at which the gas is returned thereto;
   c. cooling the compressed gas by rejecting heat to the surroundings;
   d. conducting the cooled gas to the heat exchanger wherein heat is transferred with the gas entering from the pipeline; and
   e. returning the gas to the pipeline at pipeline pressure and a temperature below that which would damage the environment.

2. The method of claim 1 wherein the gas from step (d) is conducted through an expander prior to returning it to the pipeline.

3. The process of claim 2 wherein the energy of expanding the gas is used to compress a portion of the natural gas in step (b).

4. The method of claim 3 wherein the temperature of the gas introduced to the pipeline is controlled by a closed loop controller responsive to said temperature and controlling the amount of gas expanded after step (d).

5. The method of claim 4 wherein the temperature of the gas entering the gas expander is controlled by a closed loop controller responsive to said temperature and limiting the amount of gas passing through the heat exchanger of step (d).

6. The method of claim 5 wherein the natural gas entering the system is at a pressure of from about 1,300 to 1,450 psig and a temperature of from about zero to about 20°F. and the natural gas returned to the pipeline at a pressure of from about 1,600 to about 1,800 psig and a temperature of from about 10° to about 20°F.

* * * * *